United States Patent
Le et al.

(10) Patent No.: US 6,817,459 B1
(45) Date of Patent: Nov. 16, 2004

(54) DIRECT METHOD OF TERMINATING THE GROUND COIL TERMINAL TO COIL HOUSING

(75) Inventors: Anh Le, Lockport, NY (US); Jonathan K. Hammond, Holley, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/441,594

(22) Filed: May 20, 2003

(51) Int. Cl.[7] .......................... F16D 27/112; F16D 27/14
(52) U.S. Cl. ..................... 192/84.961; 439/95
(58) Field of Search .................... 192/84.96, 84.961; 335/279, 282, 278, 289, 299; 439/95

(56) References Cited

U.S. PATENT DOCUMENTS

| | | | | |
|---|---|---|---|---|
| 3,494,453 A | * | 2/1970 | Sepko ................... | 192/84.951 |
| 3,833,871 A | * | 9/1974 | Fisher et al. ........... | 192/84.961 |
| 3,872,580 A | * | 3/1975 | Fisher et al. ........... | 192/84.961 |
| 5,307,038 A | * | 4/1994 | Ishimaru ................ | 192/84.961 |
| 5,812,044 A | * | 9/1998 | Sakamoto ................ | 192/84.96 |

* cited by examiner

Primary Examiner—Richard M. Lorence
(74) Attorney, Agent, or Firm—Patrick M. Griffin

(57) ABSTRACT

The subject invention improves the electrical connection in a clutch assembly for engaging a compressor in a vehicle air conditioning system. In accordance with the subject invention, a tab extends from the mounting plate and the second end of the ground lead is frictionally retained between the tab and the core winding housing. This is accomplished by turning a tab out of the plane of a mounting plate, placing the second end of the ground lead under the tab and bending the tab downwardly to clamp the second end of the ground lead between the tab and the core winding housing to frictionally retain the second end of the ground lead between the tab and the core winding housing.

10 Claims, 2 Drawing Sheets

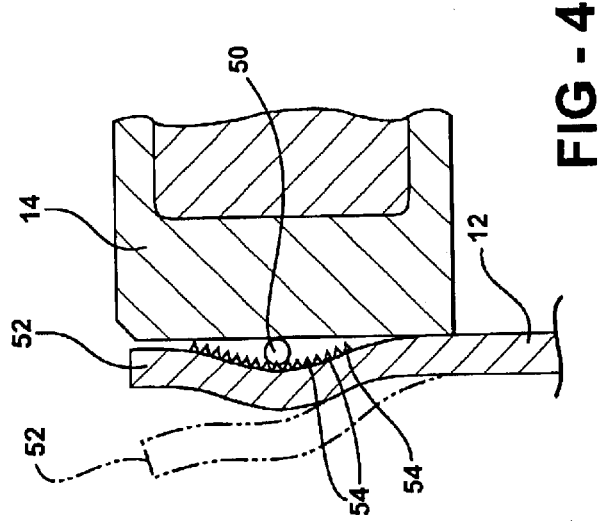
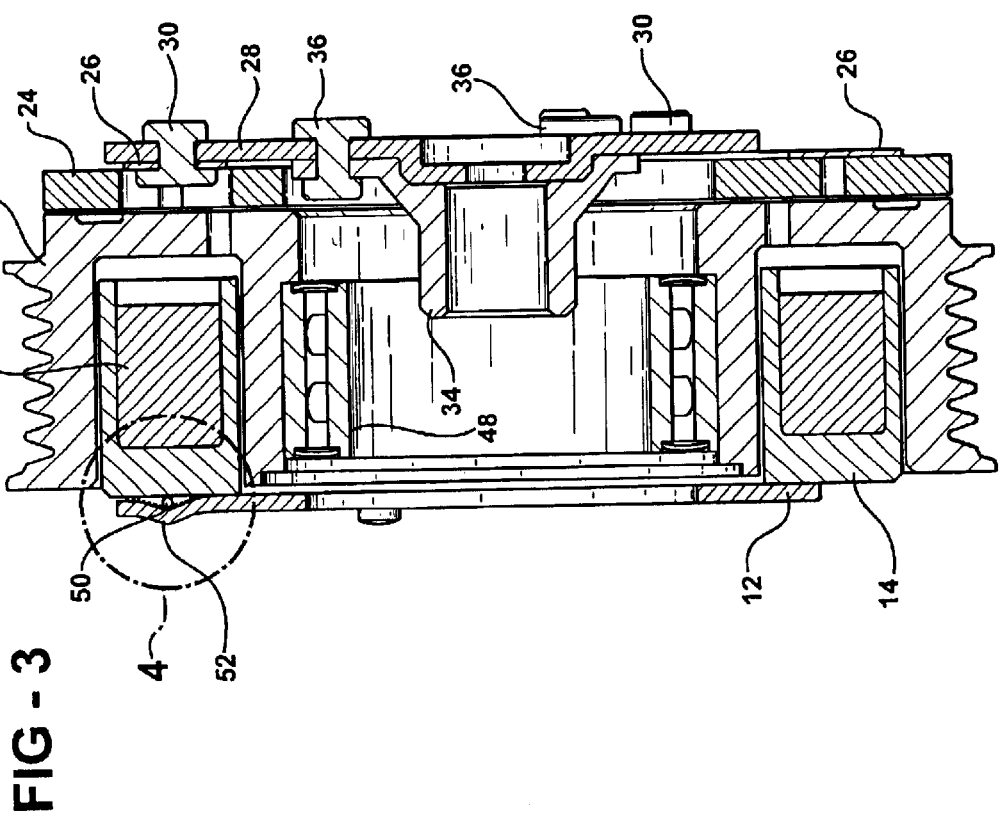

DIRECT METHOD OF TERMINATING THE GROUND COIL TERMINAL TO COIL HOUSING

FIELD OF THE INVENTION

The subject invention relates to the electrical connection in a clutch assembly for engaging a compressor in a vehicle air conditioning system.

BACKGROUND OF THE INVENTION

In an automotive air conditioning system, an electrical coil winding in an electromagnetic/mechanical clutch engages a compressor to pump refrigerant upon demand by the user. The coil winding is disposed within a core housing that is attached to a mounting plate. The coil winding is supplied electrical power from the vehicle electrical system and is grounded to the mounting plate.

A ground lead electrically interconnects the coil winding and the mounting plate, usually by removing insulation from the ground lead and crimping a ring terminal onto the ground lead. A stud extends from the mounting plate and the ring terminal is disposed over the stud, after which the stud is flattened over the ring terminal to create a mechanical joint that completes the ground circuit.

Although the current systems perform perfectly well, there is always a use for an alternative grounding method that reduces the fabrication steps and eliminates components.

SUMMARY OF THE INVENTION AND ADVANTAGES

The subject invention improves the electrical connection in a clutch assembly for engaging a compressor in a vehicle air conditioning system. Such a clutch assembly comprises a mounting plate having opposite faces with a core winding housing supported on one face of the mounting plate and a core winding disposed in the core winding housing. A drive housing surrounds the core winding housing for magnetically coupling with the core winding in response to electrical power being supplied to the core winding. A first end of a ground lead is connected to the core winding and a second end is connected to the mounting plate. In accordance with the subject invention a tab extends from the mounting plate and the second end of the ground lead is frictionally retained between the tab and the core winding housing.

This is accomplished by turning a tab out of the plane of a mounting plate, placing the second end of the ground lead under the tab and bending the tab downwardly to clamp the second end of the ground lead between the tab and the core winding housing to frictionally retain the second end of the ground lead between the tab and the core winding housing.

This simplified method of electrically connecting the ground lead to the core winding housing eliminates the extra ring terminal attached to the ground lead as well as the stud extending from the core winding housing to receive the ring terminal.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross sectional view taken along line 3—3 of FIG. 2; and

FIG. 4 is an enlarged fragmentary cross sectional view of the tab 52 of the subject invention.

DETAILED DESCRIPTION OF THE PREFERRED EMBODIMENT

Figure 2:
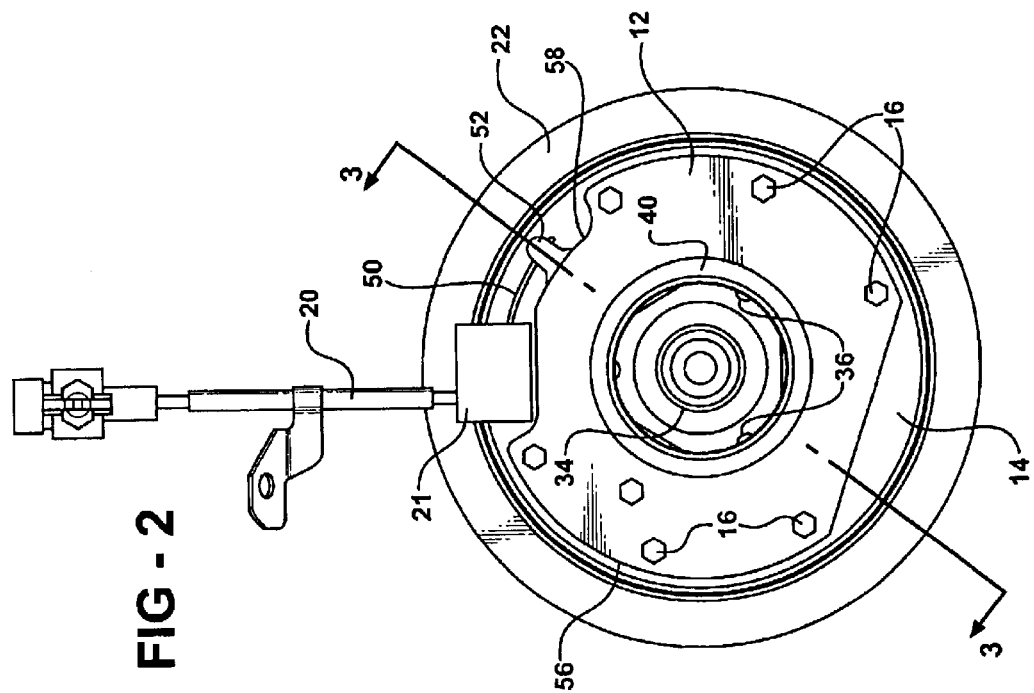
FIG. 2 is a side view from the opposite side of the clutch assembly showing the mounting plate and the tab 52 of the subject invention.
Figure 1:
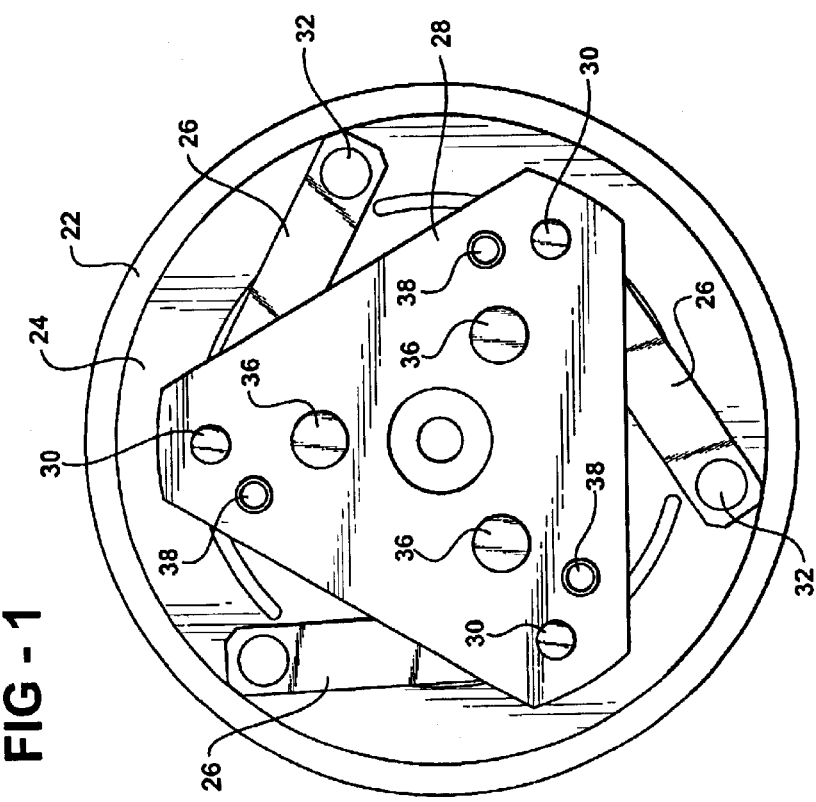
FIG. 1 is a side view of side view of the drive plate side of a clutch assembly incorporating the subject invention.

Referring to the drawings, where like numerals indicate like parts throughout the several views, a clutch assembly for engaging a compressor in a vehicle air conditioning system is shown.

The assembly includes a mounting plate 12 having opposite faces and a core winding housing 14 supported on one face of the mounting plate 12. As is well known in the art, the mounting plate 12 is secured to the core wing housing 14 by a plurality of fasteners 16.

Also as well known in the art, a core winding 18 is disposed in the core winding housing 14 and a drive housing surrounds the core winding housing 14 for magnetically coupling within said drive housing in response to electrical power being supplied to the core winding 18 by an electrical power lead 20 and junction box 21. The drive housing is an assembly of parts including an armature housing 22 surrounding the core winding housing 14 for transmitting and generating the magnetic field. An armature plate 24 is engaged by the armature housing 22 by magnetic coupling. A plurality of leaf springs 26 interconnect a drive plate 28 and the armature plate 24 via a plurality of rivets 30 and 32. A drive hub 34 is supported by the drive plate 28. Also as is well known in the art, a bearing 48 is disposed within the armature housings 22.

The A/C clutch consists of a moving pulley 22, a fixed location field coil including; back plate 12, housing 14, and winding 18, and a stationary driver including; armature plate 24, drive plate 28, hub 34, springs 26, etc.

The driver is attached to the compressor shaft and the pulley is spun by the accessory drive system of the vehicle. It is spinning 100% of the time that the vehicle is on. To start the A/C compressor pumping the armature plate 24 must engage the pulley magnetically and begin spinning at the same speed as the pulley. This in turn spins the compressor and the refrigerant system begins functioning. The pulley 22 and armature plate 24 are not assembled together but instead come into contact with each other only when the winding 18 is electronically excited generating a magnetic field which pulls the two components together. Typically the winding is assembled within a metal housing 14, this housing is generally mechanically fixed to the compressor and the pulley spins around it.

The invention relates to a ground lead 50 having a first end connected to the core winding 18 and a second end connected to the mounting plate 12. However the connection is accomplished by the mounting plate 12 having a tab 52 integral with and extending therefrom and the second end of the ground lead 50 being frictionally retained between the tab 52 and the core winding housing 14 so that the ground lead 50 is in electrical contact (i.e., grounded) with the winding housing 14. The tab 52 may include projections or serrations 54 on the tab 52 for engaging the ground lead 50. The mounting plate 12 is generally circular to define a circular periphery 56 with at least one cutout portion 58 and the tab 52 extends radially from the mounting plate 12 in the cutout portion 58. More specifically, the tab 52 extends to a distal end that is disposed within the imaginary circular periphery 56 as it is extended through the cutout portion 58.

Accordingly, the subject invention provides a method of fabricating a clutch assembly for engaging a compressor in a vehicle air conditioning system comprising the steps of turning the tab 52 out of the plane of a mounting plate 12, as is shown in phantom in FIG. 4, disposing the second end of the ground lead 50 between the tab 52 and the core winding 18, and bending the tab 52 downwardly to clamp the second end of the ground lead 50 between the tab 52 and the core winding 18 to frictionally retain the second end of the ground lead 50 between the tab 52 and the core winding 18, as shown in full lines in FIG. 4.

Particularly in those cases where the insulation is not stripped from the ground lead 50, the ground lead 50 may be provided with projections 54 extending from the tab 52 to pierce the insulation and make electrical contact with the metal lead wire.

The method may include the steps of forming the mounting plate 12 with a cutout portion 58 with the tab 52 in the cutout portion 58 and having a distal end disposed within the circular periphery 56 of the mounting plate 12.

Obviously, many modifications and variations of the present invention are possible in light of the above teachings. The invention may be practiced otherwise than as specifically described within the scope of the appended claims.

What is claimed is:

1. A clutch assembly for engaging a compressor in a vehicle air conditioning system wherein said clutch assembly comprises;
   a mounting plate having opposite faces,
   a core winding housing supported on one face of said mounting plate,
   a core winding disposed in said core winding housing for generation of magnetic field within said core winding in response to electrical power being supplied to said core winding,
   a ground lead having a first end connected to said core winding and a second end connected to said mounting plate,
   said mounting plate having a tab integral with and extending therefrom and said second end of said ground lead being frictionally retained between said tab and said core winding.

2. An assembly as set forth in claim 1 including projections on said tab for engaging said ground lead.

3. An assembly as set forth in claim 2 wherein said mounting plate is generally circular to define a circular periphery with at least one cutout portion, said tab extending from said mounting plate in said cutout portion.

4. An assembly as set forth in claim 3 wherein said tab extends to a distal end disposed within said circular periphery.

5. An assembly as set forth in claim 4 including a power lead electrically connected to said core winding for supplying electrical power to said core winding.

6. An assembly as set forth in claim 5 including an armature a plate, a drive housing surrounding said winding housing and comprising an armature housing connected to said armature plate through magnetic coupling, a drive plate, a plurality of leaf springs interconnecting said drive plate and said armature plate, a drive hub supported by said drive plate.

7. A method of fabricating a clutch assembly for engaging a compressor in a vehicle air conditioning system comprising the steps of;
   turning an integral tab out of the plane of a mounting plate supporting a core winding housing on one face thereof for magnetically coupling with a drive housing,
   connecting a first end of a ground lead to the core winding within the winding housing,
   disposing a second end of said ground lead between the tab and the core winding housing, and
   bending the integral tab downwardly to clamp the second end of the ground lead between the tab and the core winding housing to frictionally retain the second end of the ground lead between the tab and the core winding housing.

8. A method as set forth in claim 7 including engaging the ground lead with projections extending from the tab.

9. A method as set forth in claim 7 including forming the mounting plate with generally circular periphery with a cutout portion and forming the tab in the cutout portion.

10. A method as set forth in claim 9 including forming the tab with a distal end disposed within the circular periphery.

* * * * *